United States Patent [19]

Fremont

[11] 3,755,707

[45] Aug. 28, 1973

[54] TELEVISION CAMERAS

[75] Inventor: Andrew de Mouilpied Fremont, Great Baddow, England

[73] Assignee: The Marconi Company Limited, London, England

[22] Filed: Oct. 14, 1970

[21] Appl. No.: 80,711

[30] Foreign Application Priority Data

Nov. 7, 1969 Great Britain .................. 54,560/69

[52] U.S. Cl. ........................ 315/22, 315/10, 315/26, 315/27 TD

[51] Int. Cl. ............................................ H01j 31/34

[58] Field of Search .................. 315/10, 22, 26, 11, 315/31, 27 TD; 178/7.1

[56] References Cited

UNITED STATES PATENTS

| | | | |
|---|---|---|---|
| 2,812,472 | 11/1957 | Welliver | 315/22 |
| 3,134,927 | 5/1964 | Haines | 315/27 TD |
| 3,221,209 | 11/1965 | Greiner | 315/10 |
| 3,430,096 | 2/1969 | Hansen et al. | 315/22 |
| 2,987,645 | 6/1961 | Hudgins | 315/11 |
| 3,548,250 | 12/1970 | Roosmalen et al | 315/11 X |

OTHER PUBLICATIONS

Millman et al. Pulse, Digital, and Switching Waveforms, McGraw-Hill Inc., 1965, pp. 302–305.

*Primary Examiner*—Carl D. Quarforth
*Assistant Examiner*—E. E. Lehmann
*Attorney*—Baldwin, Wight & Brown

[57] ABSTRACT

A television camera having at least one camera tube of the Vidicon type in which an electron switch increases the potential applied to the electron gun cathode at and near the beginning and end of field and line deflection in the tube, so that the problem of edge brightening is reduced. The electrom switch increases the applied potentials upon receipt of signals from the normally provided field and line deflecton circuits of the tube.

9 Claims, 4 Drawing Figures

Andrew de Mouilpied Fremont INVENTOR
BY Baldwin, Wight & Brown
ATTORNEYS

TELEVISION CAMERAS

This invention relates to television camera and more specifically to television cameras employing television camera tubes of the kind in which an optical image of a subject of transmission is projected upon a photoconductive target which is situated within the envelope of the tube — usually in the form of a thin layer of photo-conductive material on a light transparent deposit on the inside of the end wall of the tube — and is scanned by a cathode ray to develop picture signals. Camera tubes of this kind are well known, the so-called Vidicons being well known examples.

A defect of known camera employing camera tubes of the kind referred to — and especially of such tubes in which the photo-conductive material is lead-oxide — is that if the video signal output from such a tube is utilised to reproduce a picture, the reproduced picture shows unduly light edges round it. While the utility and benefit of the present invention (the main object of which is to avoid or reduce this defect) are not dependent upon the sufficiency or accuracy of the theory now to be advanced, it is believed that the theory which follows is correct and its presentation helps in an understanding of the invention. The theory will be set out with reference to the upper part of FIG. 1 of the accompanying drawings which can be regarded, for the present purposes as an equivalent representation of the photo-conductive target and scanning cathode ray of a Vidicon or other camera tube of the kind referred to.

Figure 1:
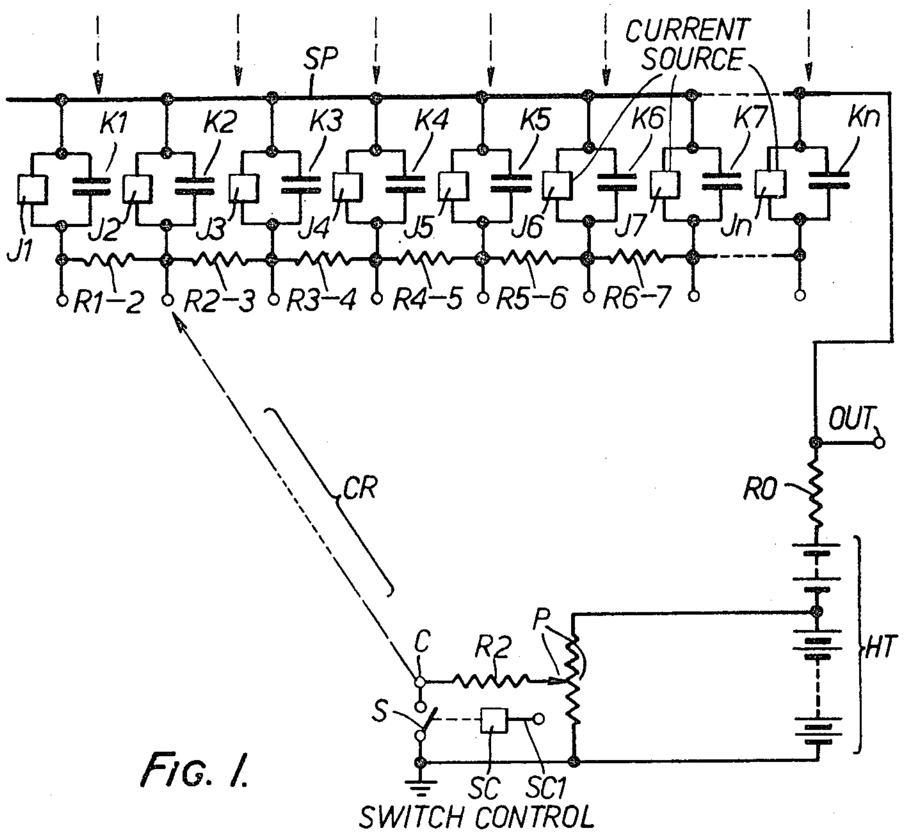

It is believed that the defect above mentioned is due to surface electrical leakage across the face of the photo-conductive target and that it is brought about as follows. In the upper part of FIG. 1 the photoconductive target is represented as though it consisted of a great number of small elements connected together by the signal plate of the target. Each of these elements consists of a capacity across which is a potential. In FIG. 1, the light from the subject of transmission is represented by the arrow headed dotted lines as falling upon the metal signal plate SP of the target each notional element of which is a capacitor $K_1$ – Kn across which is a current source $J_1$ – Jn. The capacitor is an elemental portion of the self-capacity of the target and the current source provides a current (and therefore a voltage) representative of the light incident upon the target element considered. The signal plate SP forms a common connection on one side and is connected through an output resistance RO to the positive terminal of an operating DC potential source HT. However there will be surface leakage across the target and this in represented in the upper part of FIG. 1 by a number of resistance $R_{1\text{-}2}R_{2\text{-}3}R_{3\text{-}4}$ — and so on. The scanning cathode ray, by means of which video output signals are derived, is represented by the chain line CR and is, in normal practice, simply returned to a suitable point on the potential source HT and video output is taken off to the associated amplifier (not shown) from the terminal OUT. The cathode ray, of course, is deflected (by means not shown) to scan the target in a television raster of lines in the usual way. The switch and associated circuitry shown in the lower part of FIG. 1 may, for the moment, be ignored as they constitute a schematic showing of a embodiment of the present invention and will be referred to later when the said invention comes to be explained.

The theory of operation is that, when an element is illuminated, the resultant elemental photo-current tends to discharge the associated elemental capacity and each such capacity is charged when the scanning cathode ray reaches it thus causing an elemental current to flow to charge the capacity. The voltage on the cathode ray side of the element falls and stabilises at a voltage which is slightly positive with respect to the cathode (represented by point C) of the electron gun of the tube. Of course the optical image projected on to the target of the tube will, in practice, not occupy the whole of the target, the edges of the image lying inside the edges of the target. Also the scanning raster will, in practice not occupy the whole of the image, the edges of the scanning raster lying inside those of the image. In addition the useful part of the scanning raster (the portion which is used for the development of video output signals) will have an area which does not occupy the whole of the raster area (by raster area is here meant an area one dimension of which is the full length of a line up to the beginning of flyback and the other dimension of which is the full extent of a frame deflection, up to the beginning of flyback.) There are, therefore, four areas one inside the other. The largest is the target area, the next largest is the image area, the next largest is the raster area, and the smallest will be termed the video output area. A target element in the image area but outside the raster area will be illuminated but not scanned. Such an element will have its capacity discharged and will tend to stabilise with the voltage, on the cathode ray side thereof, nearly equal to the applied target supply voltage. $V_T$. A target element in the raster area but not in the video output area will have its capacity charged and will tend to stabilise with the voltage on the cathode ray side thereof at a value $V_K$ which is slightly positive to that of the gun cathode. A target element in the video output area will also tend to stabilise at a voltage slightly positive to $V_K$. The presence of the leakage resistances $R_{1\text{-}2}$ $R_{2\text{-}3}$ – and so on between the different elements prevents these stabilised values of voltage being retained and one result of leakage is to cause the charges in the capacities in the elements which are in the raster area (but outside the video output area) to leak away so that the voltages on the cathode ray side of these elements, which should be $V_K$ tend to rise towards $V_T$. In consequence the capacities in the elements at and near the edges of the video output area tend to discharge and the overall result is to produce the defect above mentioned i.e. bright edges round a reproduced picture obtained by utilisation of the output signals of the tube. The more noticeable and objectionable edge brightening is that which appears over the edges which are parallel to the line direction — i.e. horizontal edges in normal practice — and the main object of the invention is to reduce this edge brightening. The invention may, however, be used to reduce all edge brightening and best results are achieved when this is done, though as will be obvious later, it is more costly in apparatus to do this.

According to this invention a television camera including at least one camera tube of the kind having an optical image receiving photo-conductive target which is scanned by a cathode ray to develop picture signals comprises means for increasing, at and near the beginning and the end of field deflection in the tube, the applied target/electron gun cathode voltage.

Preferably means are also provided for increasing said voltage, at and near the beginning and the end of line deflection in the tube.

For increasing the said voltage at and near the beginning and end of field deflection there is preferably employed an electronic switch device which is operative to change the potential applied to the electron gun cathode and is controlled by a control signal derived from the normally provided field deflection circuit of the tube.

For increasing the said voltage at and near the beginning and end of line deflection there is preferably employed an electronic switch device which is operative to change the potential applied to the electron gun cathode and is controlled by a control signal derived from the normally provided line deflection of the tube.

Preferably there is employed a single electronic switch device controlled by control signals derived from the normally provided field and line deflection circuits of the tube.

Preferably the value to which the target/electron gun cathode voltage is increased is adjustable.

A preferred form of electronic switch device and control circuit therefor comprises three transistors in series across a D.C. potential source, the more positive two of said transistors being of opposite conductivity types and having their collectors connected together; means for applying to the bases of said two transistors a train of pulses derived from a deflection circuit of the tube to render the more positive of said two transistors conductive during fly back of the deflection in question, the said two transistors being alternatively conductive; a fourth transistor; means for applying to the base of the fourth transistor a train of pulses also derived from said deflection circuit to render said fourth transistor conductive during periods slightly overlapping said fly back periods; means for applying voltage at the common collector junction of said two transistors to the electron gun cathode of the tube; and a circuit, completed when the fourth transistor is rendered conductive, for earthing the base of the least positive of the three series transistors.

The complete

Figure 2:
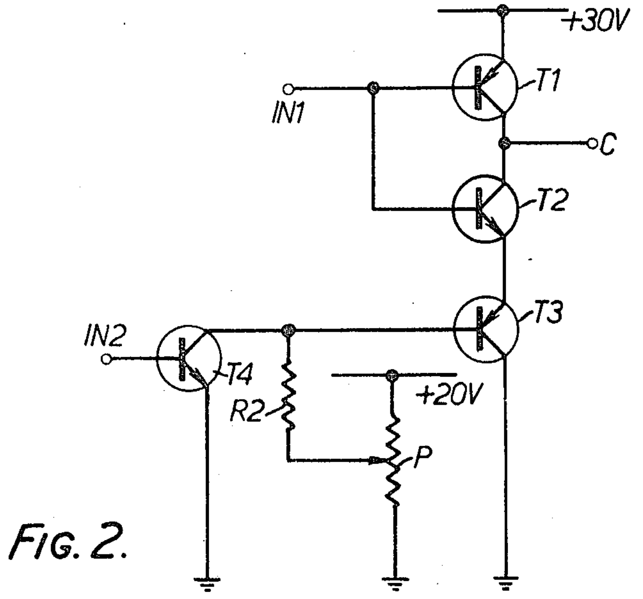
Figure 3:
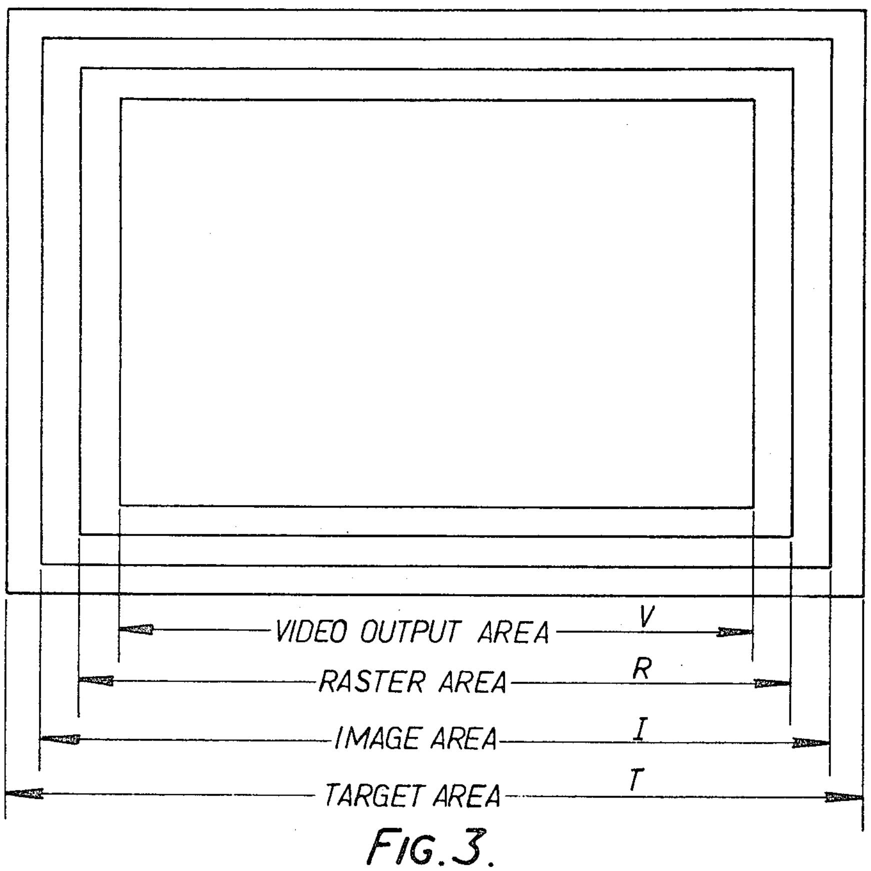
Figure 4:
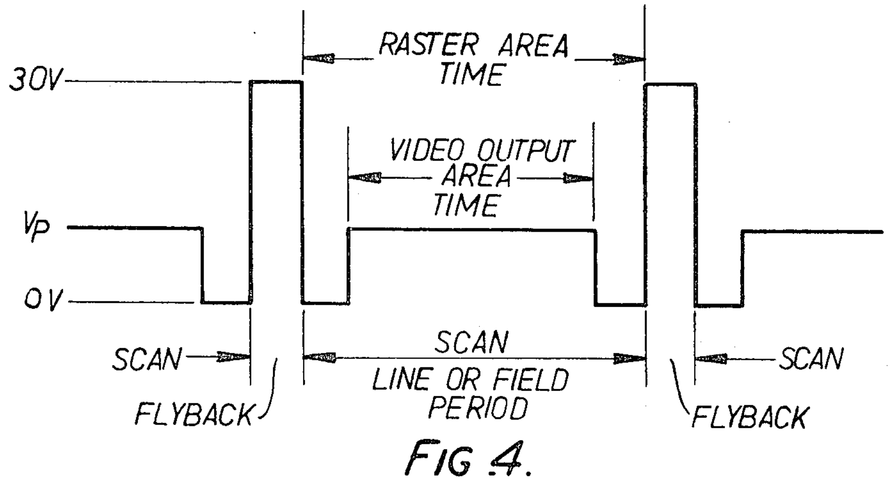

FIG. 1 is a schematic representation of one embodiment of the invention;

FIG. 2 of the accompanying drawings is a diagrammatic representation of one preferred form of automatic switching circuit which may be used in carrying out the invention;

FIG. 3 is a graphical representation of the target, image, raster and video output areas; and FIG. 4 is a timing diagram illustrating cathode voltage as related to the line and/or field periods.

Most of FIG. 1 has already been described in the foregoing explanation of theory. However it will be seen that the cathode C of the electron gun is taken to earth through a switch S, represented as a mechanical switch though in practice an electronic switching circuit such as that shown in FIG. 2 could be used. This switch is closed automatically by control means represented by the block SC, the times and periods of closure being described later herein. The cathode C is also connected through a resistance R2 to the adjustable slider of a potentiometer P the resistance of which is connected across part of the potential source HT. As will be apparent when the switch is closed the cathode potential is that of earth: when the switch is open the cathode potential is changed to a value $V_p$ which is determined by the adjustment of the potentiometer P and the potential source portion across which the potentiometer is connected.

Suppose for simplicity that it is required merely to reduce or eliminate the undesired brightening of the top and bottom edges of the picture. This will produce a substantial improvement as compared with normal practice although, of course, not so great an improvement as will be obtained if brightening of all the edge is reduced or eliminated. However improvements as regards the top and bottom edges are more easily obtained. for such improvements the control means are actuated by a wave form applied at SC1 and derived from a suitable field deflecting circuit, this wave form being so timed and consisting of pulses of such width that the switch S is closed just before field fly back begins and re-opens just after the end of field fly back, so that the switch is open during that part of a field deflection in which the cathode ray spot is between the top and bottom edges of the video output area but is closed during those parts of a field deflection in which the cathode ray spot is above said top edge or below said bottom edge. For the reduction or elimination of undesired brightening of the side edges of the picture the control would be arranged to open the switch during that part of the line excursion extending across the video output area, to close it just before line flyback, and to reopen it just after line flyback so that closure occurs during those parts of line excursion lying outside the video output area.

The above principle will be evident from FIG. 4 wherein at the beginning and ending of each scan period the cathode voltage will be at earth potential, at the blanking potential of about 30 volts during flyback and at the scanning level $V_p$ during the scan periods covering the video output area times.

FIG. 2 is a circuit diagram of a switching circuit employing both types of control to reduce or eliminate brightening of all four picture edges.

The circuit of FIG. 2 includes three transistors $T_1$ T2 and T3 in series across the potential source HT (see FIG. 1). This source may be, for example, of 30 volts. The transistors T1 and T2 are of opposite conductivity types the former being (like transistors T3) of the PNP type. At terminal $IN_1$ is applied a pulsed wave form, with positive and negative going portions, derived from any convenient points in the normally provided field and line deflection circuits (not shown). The negative going portions of this wave form render $T_1$ conductive and $T_2$ cut off during flyback periods and the positive going portions render $T_2$ conductive and $T_1$ cut off at other times. A second rectangular wave form, derived from the same deflection circuits is applied at $IN_2$ to the base of a further transistor $T_4$. This wave form renders $T_4$ conductive during periods each of which starts a little before each flyback and ends a little after each flyback. The emitter of $T_4$ is earthed and its collector is connected to the base of $T_3$ and also through a resistance $R_2$ (corresponding with the resistance $R_2$ of FIG. 1) to the slider of a potentiometer P (corresponding with P of FIG. 1) the resistance of which is connected across a portion of the source HT (FIG. 1) — for example the portion between earth and +20 volts. The common collector junction of $T_1$ and $T_2$ is connected to the cathode C of the electron gun.

It will be seen that, with this circuit, when $T_2$ is conductive and $T_1$ and $T_4$ are cut off — this will occur all the time that the cathode ray spot is in the video output area — the voltage on the cathode C will be the normal operating voltage which is determined by the voltage across the potentiometer P and the adjustment thereof. When the spot is outside the video output area but inside the raster area, $T_2$ remains conductive, $T_1$ remains cut off but $T_4$ is conductive. The voltage on the cathode C will now be at substantially earth potential. During flyback $T_1$ is conductive (so that $T_2$ is cut off) and when $T_1$ is conductive the cathode is brought to a potential of substantially +30 volts and, in this condition, the cathode ray is cut off. Thus it can be seen that the voltage on the target within the raster area but outside the video output area will be stabilised at a lower voltage than the voltage on the target within the video output area.

The target area T is indicated in FIG. 3 and the image area I lies wholly within the target area. Simiarly, the raster area R lies wholly within the image area and the video output area V lies wholly within the raster area.

I claim:

1. A television camera including a camera tube of the kind having an optical image receiving photoconductive target of selected area upon which an image is received covering an image area smaller than and having its edges lying inside the edges of said selected area which is scanned by a cathode ray over a raster area smaller than and having its edges lying inside the edges of said image area to develop picture signals over a video output area smaller than and having its edges lying inside the edges of said raster area, said camera also including electron gun cathode means for producing a cathode ray spot, means for causing said cathode ray spot to scan said raster area at television line and field frequencies, means for normally applying a selected voltage difference between said target and said electron gun cathode means during said scanning, and means for increasing said voltage difference during that part of field deflection in which the cathode ray spot is above the top edge of the video output area and below the bottom edge of the video output area.

2. A camera as claimed in claim 1 wherein means are also provided for increasing said applied target/electron gun cathode voltage during that part of line deflection in which the cathode ray is to the left of the left hand edge of the video output area and to the right of the right hand edge of the video output area.

3. A camera as claimed in claim 2 wherein said means for increasing the said voltage during field deflection includes an electronic switch device which is operative to change the potential applied to the electron gun cathode and is controlled by a control signal derived from the normally provided field deflection circuit of the tube.

4. A camera as claimed in claim 3 wherein said means for increasing the said voltage during line deflection includes an electronic switch device which is operative to change the potential applied to the electron gun cathode and is controlled by a control signal derived from the normally provided line deflection of the tube.

5. A camera as claimed in claim 4 wherein said means for increasing said voltage comprises a single electronic switch device, controlled by control signals derived from the normally provided field and line deflection circuits of the tube.

6. A camera as claimed in claim 5 including means for adjusting the value the target/electron gun cathode voltage.

7. A camera as claimed in claim 6 wherein said electronic switch device comprises three transistors in series across a D.C. potential source, the more positive two of said transistors being of opposite conductivity types and having their collectors connected together; means for applying to the bases of said two transistors a train of pulses derived from a deflection circuit of the tube to render the more positive of said two transistors conductive during fly back of the deflection in question, the said two transistors being alternately conductive; a fourth transistor; means for applying to the base of the fourth transistor a train of pulses also derived from said deflection circuit to render said fourth transistor conductive during periods slightly overlapping said fly back periods; means for applying voltage at the common collector junction of said two transistors to the electron gun cathode of the tube; and a circuit, completed when the fourth transistor is rendered conductive, for earthing the base of the least positive of the three series transistors.

8. In a television camera of the type having photoconductive target means encompassing a selected area and within which selected area an image is received in an image area smaller than and having its edges lying inside the edges of said selected area, electron gun cathode means for producing a cathode ray spot, means for causing said cathode ray spot to scan said image area at television line and field frequencies to cover a raster area smaller than and having its edges lying inside the edges of said image area and within which raster area there is provided a video output area smaller than and having its edges lying inside the edges of said raster area, and means for normally applying a selected voltage difference between said target means and said cathode means during said scanning, the improvement comprising:

control means connected to said means for causing scanning and to said means for normally applying voltage difference for causing an increase in said voltage difference when said spot is scanning at least within those boundary regions of said raster area above and below said video output area.

9. In a television camera as defined in claim 8 wherein the last means causes said increase in voltage difference outside said video output area both in the television field and line directions.

* * * * *